F. S. MOON.
METHOD OF RECOVERING WATER SOLUBLE MATERIAL FROM FURNACE GASES.
APPLICATION FILED JULY 5, 1918.
1,377,363. Patented May 10, 1921.
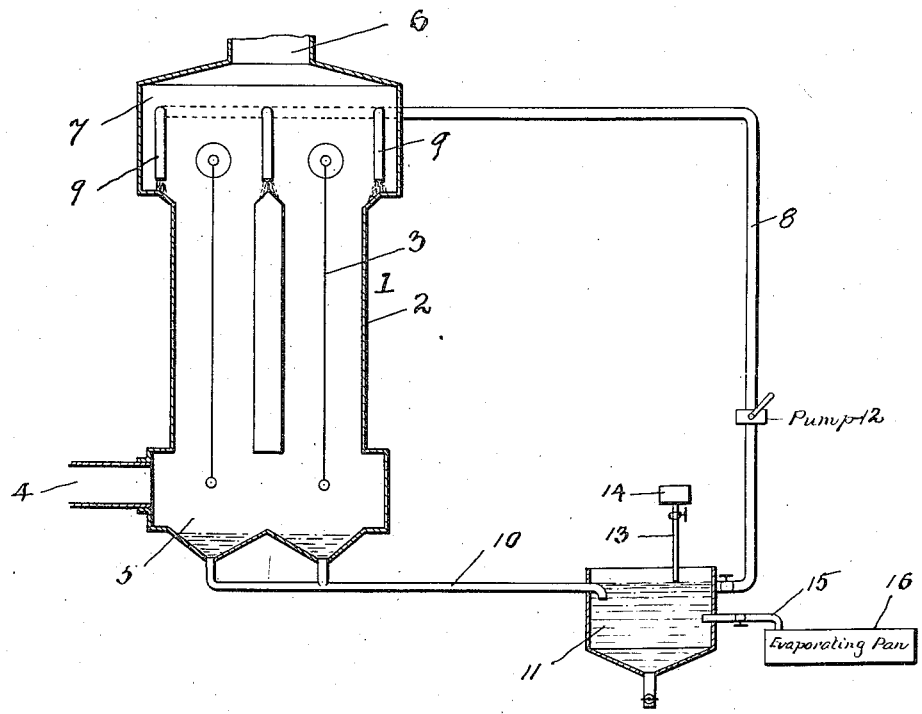
Inventor:
Freeman S. Moon
by Byrnes Townsend & Brickenstein
Attys.

UNITED STATES PATENT OFFICE.

FREEMAN SCOTT MOON, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

METHOD OF RECOVERING WATER-SOLUBLE MATERIAL FROM FURNACE-GASES.

1,377,363.              Specification of Letters Patent.     Patented May 10, 1921.

Application filed July 5, 1918. Serial No. 243,389.

*To all whom it may concern:*

Be it known that I, FREEMAN SCOTT MOON, a citizen of the United States, residing at Los Angeles, in the county of Los Angeles, State of California, have invented a new and useful Method of Recovering Water-Soluble Material from Furnace-Gases, of which the following is a specification.

This invention is applicable to the recovery of water soluble materials from hot furnace gases of various kinds, but is intended particularly for use in connection with the recovery of potassium compounds from the gases passing from rotary cement kilns. Such gases are generally at a high temperature and contain considerable proportions of suspended material, including the fumes of potassium compounds. It has been found practicable and commercially advantageous to recover the potassium compounds from such hot kiln gases by passing the gases in contact with a flowing body or stream of water or solution, the suspended material being taken up by such a body or stream of water or solution and thereby withdrawn from the gases.

In order to more effectively collect the suspended material in such body or stream of water or solution, it is preferable to carry out the operation in the presence of an electrical field which causes the suspended material to be precipitated from the gases into the flowing body or stream. For this purpose the body or stream of water or solution is caused to flow over vertically extended plates or surfaces, constituting collecting electrodes, and discharge electrodes are arranged opposite said plates, and a suitable high tension electrical field is maintained between the discharge and collecting electrodes.

In such an apparatus it has been found desirable to make the collecting electrodes of cementitious material, such as concrete, both for reasons of economy and durability, and on account of the fact that the porous surfaces of such material are better than a smooth, metallic surface for distribution of water or solution thereover in a thin, uniform stream.

It has been found that under such conditions there is a tendency for the material precipitated into, and taken up by, the flowing stream, to become deposited or incrusted on certain parts of the electrodes and other surfaces over which the water or solution flows, this effect being particularly noticeable at those parts of the apparatus where the temperature is relatively high. Such scaling or incrustation of the surfaces of the apparatus has been a serious drawback to the continued successful commercial operation and the main object of the present invention is to overcome this difficulty.

My invention consists essentially in adding to, or incorporating with, the water or solution used for taking up the collected or precipitated suspended material from hot kiln gases, an agent or medium which will prevent the formation or cumulation of such scale or incrustation. For this purpose I may use any agent which so affects the physical or chemical properties of the surfaces over which the liquid flows as to tend to hold the suspended or dissolved material in the liquid and inhibit adhesion or cumulation or crystallization of such material on said surfaces.

As suitable agents for this purpose I have used tallow, glue and soap, and I may use any one of these, or equivalent substances, or a mixture of any two or more of same.

The accompanying drawing is a diagrammatic illustration of an apparatus suitable for carrying out my invention, said apparatus comprising an electrical precipitator and suitable means for circulating liquid therein. Said electrical precipitator comprises collecting electrodes 2 formed, for example, as vertical plates or pipes and discharge electrodes 3 formed, for example, as wires hung opposite said plates, and suitably insulated and connected to a source of high potential electric current. An inlet 4 for the gases to be treated communicates with a header 5 opening into the lower ends of the passages formed between or within said collecting electrodes 2, said passages opening at their upper ends into an upper header, from which the gases are discharged into an outlet flue 6. The liquid is supplied to said precipitator by nozzles 9 communicating with a pipe 8 and the liquid is carried away from the bottom of the precipitator by the drain pipe 10 discharging into a sump 11 from which the liquid is returned to the pipe 8 by pump 12. The retarding agent or retarder may be supplied to the sump 11 by pipe 13 from a tank or reservoir 14. The solution formed by the operation of the process may be drained off from sump 11 through pipe 15 to a suitable evaporating pan 16.

My invention may be carried out as follows:

A liquid, consisting of water or solution, is circulated through a dust and fume collecting apparatus 1, consisting, for example, of an electrical precipitator, in such manner as to pass downwardly over vertical surfaces therein, and the gases to be treated are passed in contact with said surfaces, and the electrical field maintained adjacent to said surfaces in the manner above set forth, so as to precipitate suspended material from the hot furnace gases into the downwardly flowing streams of water or solution.

The solution flowing from said surfaces and collecting in the sump 11 is treated by decantation, filtering or otherwise, to remove more or less of the solids therefrom, and the resulting solution is returned by pump 12 for recirculation to the collecting electrodes. By recirculation of the liquid, in this manner, there is a continual accumulation of water solubles in the liquid, consisting, for example, in the case of gases from rotary cement kilns, of potassium compounds, together with other soluble salts, including, in general, more or less lime compounds. The said potassium compounds may be present in a form of sulfate, or other salt, according to the manner in which the burning operation is carried out in the kiln, for example, in case sodium chlorid is used with the cement raw mix to increase volatilization of potassium compounds, a considerable proportion of the potassium compounds collected in the stream of water or solution will consist of potassium chlorid.

In addition to the solubles dissolved in this manner, in the water or solution, there is a considerable amount of insoluble suspended material precipitated or collected therein and carried down therewith. There is a tendency, as the soluble and insoluble material accumulates in the liquid, to form incrustations or scale on the surfaces over which it flows, particularly at the hotter parts of the stream where the hot gases first encounter the liquid. In general, the gas and liquid streams flow in counter-current so that the hot gases are first brought in contact with the liquid which has been longest in contact with the gases and is therefore relatively hot and is also heavily charged with collected material, and it is at such points that scale is most liable to be found.

In order to prevent deposition or building up of adherent deposits, scales or incrustations on the surfaces over which the streams of water or solution flow, I add to the water or solution at any suitable point in the circulation thereof, a small amount of a suitable retarder, tending to prevent the building up of such adherent deposits such retarder being supplied, for example, from the reservoir 14 through pipe 13 to sump 11. For this purpose I may, in the treatment of certain cement kiln gases, add, say, five pounds of tallow and five pounds of glue to two thousand gallons of the solution; or an equivalent quantity of tallow alone, or of glue alone, or of other suitable retarder, may be used.

I have found that the presence of such retarder in the solution prevents the building up or formation of the scale or incrustation above referred to, and even tends to remove any scale or incrustation already formed. I have also found that in the cyclic operation of the process as above described, in which the solution decanted or filtered from the insolubles is continually returned to the collection apparatus for taking up a further quantity of suspended material from the hot gases, that the retarder remains in the liquid or solution, or at least the effect thereof, in preventing incrustation, is retained, for a comparatively long time so that a limited amount of the retarder will be effective for a considerable time.

In place of, or in addition to, the particular retarders above mentioned, any equivalent material may be used, having the property of so changing the physical or chemical characteristics of the liquid, or of the surfaces over which it flows as to prevent the building up of adherent scale thereon, from the constituents in the liquid. Thus, in the place of the tallow above referred to, any other suitable fatty material, and in the place of glue, any other suitable gelatinous material may be used, and various substitutes for either or both of these materials may be employed, acting, as colloidal, or as emulsifying, agents, or otherwise, to prevent or remove incrustation.

The action of these retarders is believed to be mainly physical, changing the surface tension of the liquid and forming a colloidal solution or emulsion which interferes with the separation of crystalloids from the liquid and the adherence of the same to the solid. Such retarders also appear to have an effect on the physical nature of the surfaces over which the liquid flows, tending to make the same less favorable for attachment of the crystalloid constituents of the liquid thereto.

The solution obtained by circulation of the water, or other liquid, in contact with the hot kiln or furnace gases, in the manner above described, eventually becomes of sufficient concentration for the purpose desired, and is then wholly or partially removed from the flowing cycle of liquid and is evaporated, or otherwise treated, to recover the constituents thereof, these constituents including, in the particular case referred to, potassium compounds derived from the hot kiln gases. Thus said liquid may be evaporated to dryness or the desired solubles may be recovered by concentration and crystallization. The sludge filtered from the solution, as above described, may also contain valuable constituents, and may be treated for recovery thereof, or may be sold on the basis of its content of such constituents.

While I have described my invention as applied in connection with electrical precipitation of the suspended material from cement kiln gases, into a body of liquid flowing over distributing surfaces, it will be understood that it is also applicable when the body of liquid is used, without the action of an electrical field, for direct absorption or scrubbing action on the gases. And also that the process is applicable in any case where the material collected in a body of liquid, from hot furnace gases, has a tendency to form an incrustation or scale on the surfaces over which it flows.

In applying the retarder to the liquid, as above described, said retarder is distributed in the liquid in any suitable manner, for example, in the case of tallow, the same may be melted and introduced into the liquid, or heated with water and then introduced into the liquid, and a saponifier may be also used, if desired.

In case glue is used, the same may be first heated with water and then applied to the liquid or solution for treatment of the gas.

In the operation of the process above described, the liquid is heated by contact with the hot kiln gases, and by reason of this high temperature of the liquid, which may approach, but not in general exceed, 100° C., the tallow, or other retarding agent, is maintained in condition of distribution in the liquid, either in colloidal or emulsified form, or otherwise, there being, in general, more or less lime or other alkali present, which tends to saponify any fatty material used as a retarder, and thereby assist in maintaining such retarder in solution, or emulsification in the liquid.

What I claim is:

1. The method of removing water solubles from hot furnace gases, which consists in passing said gases in contact with a flowing stream of liquid in which a suspended constituent of the gas is soluble in such manner as to collect in the liquid suspended constituents of the gases, including the material soluble in said liquid, adding to the liquid a retarder for preventing incrustation of constituents from the liquid on the surface over which it flows, separating insolubles from the liquid and returning the liquid to the flowing stream aforesaid, and recovering water solubles from the liquid.

2. The method of recovering water solubles from hot furnace gases, which consists in bringing said gases in contact with the liquid flowing over surfaces, maintaining an electrical field so as to precipitate suspended material into such liquid, distributing in the liquid a retarder for preventing formation of scale on the surfaces over which the liquid flows, and recovering solubles from the liquid.

3. In the treatment of hot furnace gases, for removal of suspended material therefrom, by passing said gases in contact with a circulating body of liquid, flowing over surfaces, by which said body of liquid is exposed to contact with the gases, the method of preventing formation of scale on said surfaces, which consists in distributing in said circulating body of liquid a retarder consisting of fatty material.

4. In the treatment of hot furnace gases for recovering suspended constituents therefrom by circulating a body of liquid over surfaces in contact with said gases so as to cause the said body of liquid to take up suspended material from said gases, the method of preventing incrustation on said surfaces, which consists in distributing in the circulating body of liquid, fatty material and gelatinous material, in substantially the manner described.

5. The method of removing water solubles from hot furnace gases, which consists in passing said gases in contact with a flowing stream of liquid in which a suspended constituent of the gas is soluble, in such manner as to collect in the liquid suspended constituents of the gases, including the material soluble in said liquid, adding to the liquid a retarder for preventing incrustation of constituents from the liquid on the surface over which it flows, and returning the liquid to the flowing stream aforesaid.

6. The method of recovering water solubles from hot furnace gases, which consists in bringing said gases in contact with liquid flowing over surfaces, maintaining an electrical field so as to precipitate suspended material into such liquid, and distributing in the liquid a retarder for preventing formation of scale on the surfaces over which the liquid flows.

In testimony whereof I have hereunto subscribed my name this third day of July, 1918.

FREEMAN SCOTT MOON.